(12) United States Patent
Rollins et al.

(10) Patent No.: US 10,377,569 B1
(45) Date of Patent: Aug. 13, 2019

(54) PERFORATED DECKING

(71) Applicant: Nashville Wire Products Manufacturing Company, LLC, Nashville, TN (US)

(72) Inventors: Phillip Kent Rollins, Nashville, TN (US); Randall Louis Berg, Murfreesboro, TN (US)

(73) Assignee: Nashville Wire Products Manufacturing Company, LLC, Nashville, TN (US)

( * ) Notice: Subject to any disclaimer, the term of this patent is extended or adjusted under 35 U.S.C. 154(b) by 0 days.

(21) Appl. No.: 15/939,370

(22) Filed: Mar. 29, 2018

(51) Int. Cl.
| | |
|---|---|
| B65G 1/08 | (2006.01) |
| A47F 5/00 | (2006.01) |
| A47F 1/12 | (2006.01) |
| A47F 5/16 | (2006.01) |

(52) U.S. Cl.
CPC ............ *B65G 1/08* (2013.01); *A47F 1/12* (2013.01); *A47F 5/005* (2013.01); *A47F 5/16* (2013.01); *A47F 2005/165* (2013.01)

(58) Field of Classification Search
CPC ... B65G 1/08; B65G 1/023; A47F 5/16; A47F 1/12; A47F 5/005; A47F 2005/165; A47B 96/021; A47B 55/00; A47B 57/00
See application file for complete search history.

(56) References Cited

U.S. PATENT DOCUMENTS

| | | | |
|---|---|---|---|
| 1,409,092 A * | 3/1922 | Goldfield | B65D 19/0075 108/57.23 |
| 2,381,608 A | 8/1945 | Leyerle | |
| 3,196,812 A | 7/1965 | Jacques | |
| 3,323,656 A | 6/1967 | Weiss et al. | |
| 3,814,034 A | 6/1974 | Seiz | |
| 3,900,112 A * | 8/1975 | Azzi | B65G 1/023 193/35 R |

(Continued)

FOREIGN PATENT DOCUMENTS

| | | |
|---|---|---|
| EP | 761134 A1 | 3/1997 |
| WO | 2008029019 A1 | 3/2008 |

OTHER PUBLICATIONS

Ex. A—Nashville Wire Products—Perforated Deck—brochure (2 pages) (undated but admitted to be prior art).

(Continued)

*Primary Examiner* — Ko H Chan
(74) *Attorney, Agent, or Firm* — Lucian Wayne Beavers; Alex H. Huffstutter; Patterson Intellectual Property Law, PC

(57) ABSTRACT

The present invention relates to a horizontal or slopped decking panel for use with a storage rack. The decking panel may include a plurality of laterally spaced parallel structural beams have first and second ends and a metal sheet. The metal sheet may extend around and under the first and second ends of the structural beams to define a first panel edge and a first bottom return sheet portion. The metal sheet may extend around and under the second ends of the structural beams to define a second panel edge and a second bottom return sheet portion. The metal sheet may have a plurality of top perforations. The first and second bottom return sheet portions may have first and second rows, respectively, of bottom perforations. Each of the bottom perforations may be aligned with one of the top perforations so that a post of a divider wall can be received.

23 Claims, 13 Drawing Sheets

(56) References Cited

U.S. PATENT DOCUMENTS

| | | | | |
|---|---|---|---|---|
| 3,986,616 | A | 10/1976 | Gray | |
| 4,078,664 | A | 3/1978 | McConnell | |
| 4,372,451 | A * | 2/1983 | Rasmussen | B65G 1/023 211/151 |
| 4,496,037 | A * | 1/1985 | Spamer | A47F 1/12 193/2 R |
| 4,519,508 | A | 5/1985 | Gullett et al. | |
| 4,923,070 | A * | 5/1990 | Jackle | A47F 1/12 211/126.1 |
| 5,121,681 | A * | 6/1992 | Chang | A47B 65/00 108/25 |
| 5,160,051 | A * | 11/1992 | Bustos | A47F 1/12 211/187 |
| 5,181,623 | A * | 1/1993 | Linden | A47B 57/04 211/183 |
| 5,383,409 | A | 1/1995 | Hayakawa | |
| 5,489,031 | A * | 2/1996 | Carroll | A47F 5/0068 211/134 |
| 5,577,623 | A | 11/1996 | Bustos | |
| 5,718,441 | A * | 2/1998 | Kern | A47B 57/14 211/187 |
| 5,769,249 | A * | 6/1998 | Lascara | A47B 96/1441 211/182 |
| 5,816,173 | A | 10/1998 | Warneford | |
| 6,039,192 | A | 3/2000 | Hollander | |
| 6,050,428 | A | 4/2000 | Hollander | |
| 6,132,158 | A * | 10/2000 | Pfeiffer | B65G 1/023 193/35 R |
| 6,173,658 | B1 | 1/2001 | Moberg | |
| 6,290,077 | B2 * | 9/2001 | Sosso | A47F 5/005 211/184 |
| 6,401,944 | B1 | 6/2002 | Kircher et al. | |
| 6,799,689 | B2 * | 10/2004 | Langtry | A47F 5/0018 211/134 |
| 6,871,747 | B2 * | 3/2005 | Bustos | A47F 5/01 211/118 |
| 7,156,243 | B2 | 1/2007 | Henning et al. | |
| 7,815,060 | B2 * | 10/2010 | Iellimo | B65G 1/023 108/61 |
| 8,443,992 | B2 | 5/2013 | Lawson et al. | |
| 8,919,585 | B2 | 12/2014 | Trover | |
| 9,027,767 | B2 | 5/2015 | Buckley et al. | |
| 9,375,102 | B2 | 6/2016 | Troyner et al. | |
| 9,386,855 | B2 | 7/2016 | Sabounjian | |
| 2007/0034583 | A1 | 2/2007 | Henning et al. | |
| 2010/0077781 | A1 | 4/2010 | Decker et al. | |
| 2012/0000871 | A1 | 1/2012 | Troyner et al. | |
| 2012/0067838 | A1 | 3/2012 | Lawson et al. | |
| 2014/0116973 | A1 | 5/2014 | Buckley et al. | |
| 2015/0090683 | A1 | 4/2015 | Sabounjian | |
| 2016/0220018 | A1 | 8/2016 | Hanlon | |
| 2017/0042329 | A1 | 2/2017 | Rollins et al. | |

OTHER PUBLICATIONS

Ex. B—Nashville Wire Products—Perforated Decking—brochure (1 page) (2015).

Ex. C—TRI-BORO—brochure (1 page) (undated but admitted to be prior art).

Ex. D—Pro Deck 50—brochure (1 page) (undated but admitted to be prior art).

Ex. E—DACS Punch Desk—brochure (4 pages) (2006).

* cited by examiner

PERFORATED DECKING

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

1. Field of the Invention

The present invention relates generally to decking panels. More particularly, this invention pertains to perforated decking panels having various accessory attachment points for use with storage racks.

2. Description of the Prior Art

Heavy-duty shelving assemblies are often made of steel frames with spaced decking panels for the shelves. The decking panels are often made of slats of wood or a welded wire grid. These racks can be used for hand-stacking applications and for pallet supports. These types of heavy-duty shelving systems are frequently used in factories, warehouse type stores, home improvement type stores, storage facilities, distribution centers, etc.

As these systems are frequently used in a public and/or permanent setting, they can be subject to certain regulations under state and local building codes. These regulations can include fire safety mandates that require certain fire ratings, as well as the requirement that a certain percentage of water pass through the shelving units (i.e., from overhead sprinkler systems) to reach the ground.

Currently available decking panels are often too heavy, do not meet certain state and local building codes, and do not include attachment points for accessories that help organize and separate what is loaded on the decking panel.

BRIEF SUMMARY OF THE INVENTION

In one embodiment, a decking panel is provided. The decking panel includes a plurality of laterally spaced parallel structural beams and a metal sheet. Each beam of the plurality of laterally spaced parallel structural beams may have a first end and a second end. The metal sheet may include a top sheet portion overlying the structural beams. The metal sheet may extend around and under the first ends of each of the structural beams to define a first panel edge and a first bottom return sheet portion. The sheet may extend around and under the second ends of each of the structural beams to define a second panel edge and a second bottom return sheet portion. The first and second bottom return sheet portions may be attached to an underside of each of the structural beams. The metal sheet may include a plurality of top perforations defined therein. The first and second bottom return sheet portions may include first and second rows, respectively, of laterally spaced bottom perforations defined therein. Each of the bottom perforations may be aligned with one of the top perforations so that a post of a divider wall can be received through the aligned top and bottom perforations.

Such a decking panel may also have a panel depth defined between the first and second panel edges. The decking panel may have a panel length extending perpendicular to the panel depth. The top perforations may include a plurality of rows of slots elongated parallel to the panel depth. The rows of slots may be spaced apart along the panel length by a slot row spacing. The bottom perforations of each of the first and second rows of bottom perforations may be spaced apart equal to the slot row spacing.

Such a decking panel may also include a perforated area defined by the top perforations and a top panel area defined as the panel depth times the panel length. The perforated area may equal at least 50% of the top panel area.

Such a decking panel may further be in combination with a divider wall. The divider wall may have a divider wall length parallel to the panel depth. The divider wall may include posts configured to be received through the aligned top and bottom perforations.

Such a decking panel may be configured to be a horizontal decking panel. In such a horizontal decking panel the first and second panel edges may extend substantially perpendicular to the top sheet portion and the first and second bottom return sheet portions. The horizontal decking panel may have a panel thickness defined between the top sheet portion and each of the bottom return sheet portions. Each of the bottom return sheet portions may extend depthwise from its respective edge by a bottom sheet depth. The bottom sheet depth may be greater than the panel thickness. The panel thickness may have a nominal value of 1⅝ inch.

The plurality of laterally spaced parallel structural beams of such a decking panel may include two end beams defining third and fourth panel edges. The third and fourth panel edges may extend between the first and second panel edges. The plurality of laterally spaced parallel structural beams may also include at least one intermediate beam located between the two end beams. The third and fourth panel edges may be integrally formed from the metal sheet.

Such a decking panel may further be in combination with at least one stop wall formed of sheet metal. The at least one stop wall may include a main vertical wall and an upper leg. The main vertical wall may face toward the decking panel. The main vertical wall may have a main vertical wall height that is greater than the panel thickness. The upper leg may extend downward from an upper end of the main vertical wall in a direction away from the decking panel. The upper leg may terminate short of a lower end of the main vertical wall. The main vertical wall and the upper leg may each terminate in a rearward extending horizontal flange.

Such a decking panel may be configured to be a sloped gravity feed panel. In such a sloped gravity feed panel the first panel edge may be sloped at a first obtuse angle relative to the top sheet portion. The second ends of each of the structural beams may be sloped at a second obtuse angle relative to the top sheet portion. The first and second obtuse angles may have a combined total of substantially 270 degrees. The structural beams may be formed from four sided tubing.

Such a sloped gravity feed panel may be in combination with a front stop wall formed of sheet metal. The front stop wall may include a lower vertical leg, a wall, and an upper vertical leg.

The wall is connected to the lower vertical leg and facing toward the decking panel. The wall may be sloped forward at a third obtuse angle relative to the lower vertical leg. The third obtuse angle may be substantially equal to the second obtuse angle. The upper leg may extend downward from the wall and terminate short of a lower end of the lower vertical leg. The upper and lower legs of the front stop wall may each terminate in a rearward extending horizontal flange.

Such a decking panel may further be in combination with a rack for to receiving the decking panel. The rack may include vertical support posts and horizontal box beams with notches for receiving the decking panel.

In another embodiment, a gravity feed decking panel is provided. The gravity feed decking panel may be oriented at a slope angle. The gravity feed decking panel includes a plurality of parallel structural beams and a perforated metal sheet. Each structural beam of the plurality of parallel structural beams may have a front end and a rear end. The perforated metal sheet may include a top sheet portion overlying the structural beams. The perforated metal sheet may extend around and under the front ends of each of the structural beams to define a front panel edge and a front bottom return sheet portion. The front panel edge may be sloped at a first obtuse angle to the top sheet portion. The first obtuse angle may be substantially equal to 90 degrees plus the slope angle. The rear ends of each of the structural beams may extend at a second obtuse angle relative to the top sheet portion. The second obtuse angle may be substantially equal to 180 degrees minus the slope angle.

The top sheet portion and the front bottom return sheet portion of such a gravity feed decking panel each have aligned holes. The aligned holes may be for receiving a post of a divider wall.

The structural beams of such a gravity feed decking panel may be formed from four sided tubing.

Such a gravity feed decking panel may further be in combination a front stop wall. The front stop wall may include a lower vertical leg, a wall, and an upper leg. The wall may face toward the decking panel and be inclined forward relative to the lower vertical leg by an inclination angle substantially equal to the slope angle. The upper leg may extend downward from the wall and terminate short of a lower end of the lower vertical leg. The upper and lower legs of the front stop wall may each terminate in a rearward extending horizontal flange.

Such a gravity feed decking panel may further include a plurality of perforations having a combined perforation area of at least 50% of a total area of the top sheet portion.

In another embodiment, a storage rack assembly is provided. The storage rack assembly may include two pairs of vertical support posts, a least one front box beam, at least one rear box beam, and at least one decking panel. Each pair of vertical support posts may define a rack depth. The two pairs of vertical support posts may be aligned and separated by a rack length. The at least one front box beam may be positioned along a front side of the two pairs of vertical support posts. The at least one front box beam may span between the two pairs of vertical support posts. The at least one rear box beam may be positioned along a rear side of the two pairs of vertical support posts. The at least one rear box beam may span between the two pairs of vertical support posts. Each of the front and rear box beams may include a support notch facing inward. The decking panel may span between the front box beam and the rear box beam. The decking panel may be received by the support notch of each beam. The decking panel may include a plurality of parallel structural beams and a metal sheet. Each beam of the plurality of parallel structural beams may have a first end and a second end. The metal sheet may include a top sheet portion overlying the structural beams. The metal sheet may extend around and under the first ends of each of the structural beams to define a first panel edge and a first bottom return sheet portion. The metal sheet may extend around and under the second ends of each of the structural beams to define a second panel edge and a second bottom return sheet portion. The metal sheet may include a plurality of top perforations defined therein. The first and second bottom return sheet portions may include first and second rows, respectively, of laterally spaced bottom perforations defined therein. Each perforation of the first and second rows of laterally spaced bottom perforations may be aligned with one of the top perforations so that a post of a divider wall can be received through the aligned top and bottom perforations.

The support notch of such an assembly may also include a notch height. The decking panel of such an assembly may have a panel thickness defined between the top sheet portion and each of the bottom return sheet portions. The panel thickness may be substantially equal to the notch height.

The decking panel of such an assembly may be configured to be a horizontal decking panel. The first and second panel edges of such a horizontal decking panel may extend substantially perpendicular to the top sheet portion and the first and second bottom return sheet portions.

Such an assembly may have the rear box beam positioned higher than the front box beam. The decking panel of such an assembly may be configured to be a sloped gravity feed panel. The first panel edge may be sloped at a first obtuse angle relative to the top sheet portion. The second ends of each of the structural beams may be sloped at a second obtuse angle relative to the top sheet portion. The first and second obtuse angles may have a combined total of substantially 270 degrees.

DETAILED DESCRIPTION OF THE INVENTION

In the following description, various dimensional and orientation words, such as height, width, length, longitudinal, horizontal, vertical, up, down, left, right, tall, low profile, and the like, may be used with respect to the illustrated drawings. Such words are used for ease of description with respect to the particular drawings and are not intended to limit the described embodiments to the orientations shown. It should be understood that the illustrated embodiments can be oriented at various angles and that the dimensional and orientation words should be considered relative to an implied base plane that would rotate with the embodiment to a revised selected orientation.

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

It is intended that the present disclosure covers such modifications and variations as come within the scope of the appended claims and their equivalents. Other objects, features, and aspects of the present disclosure are disclosed in the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, one or more sections of hooks and corresponding one or more sections of loops, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
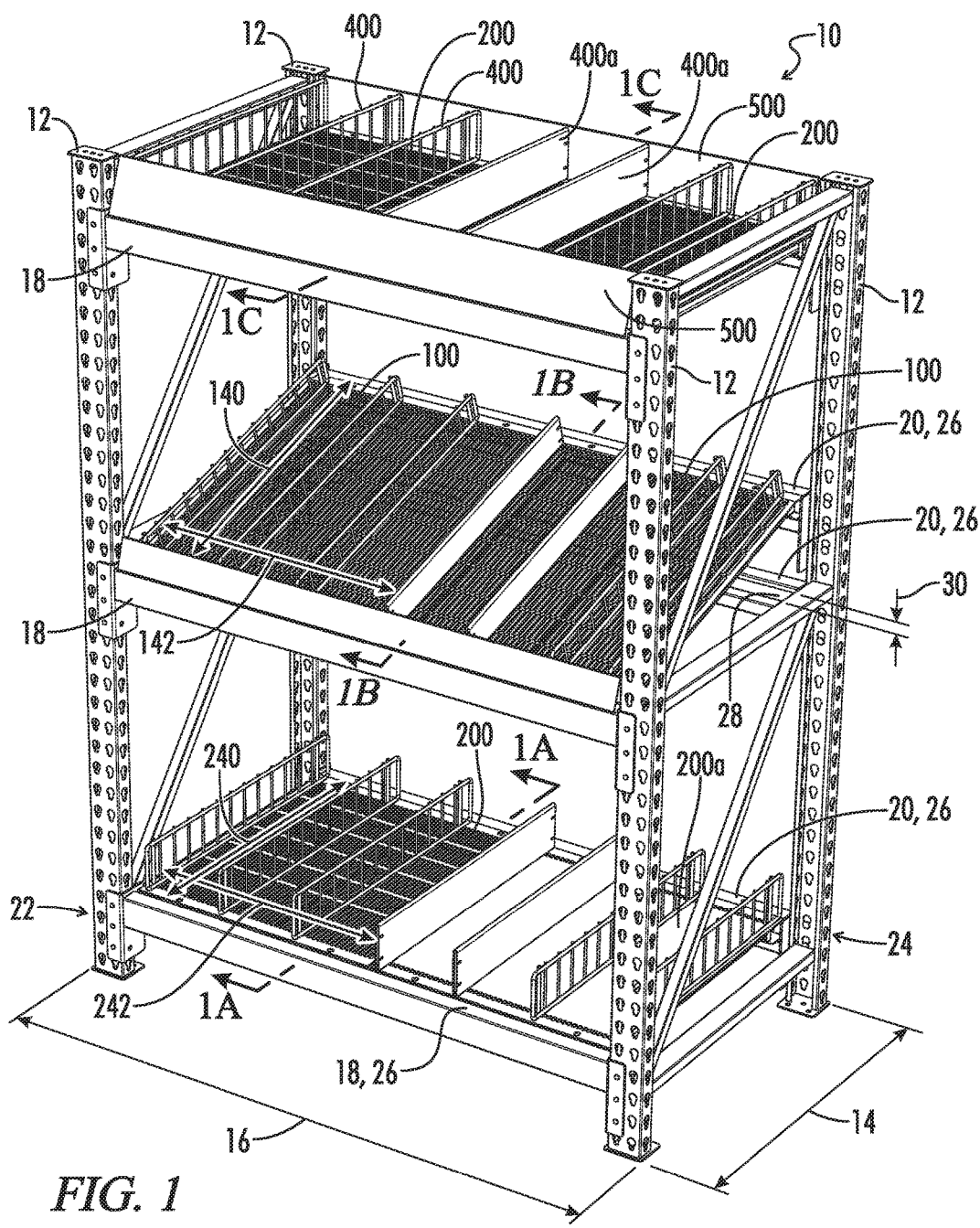
FIG. 1 is a perspective view of a storage rack assembly in accordance with the present disclosure.
Figure 1A:
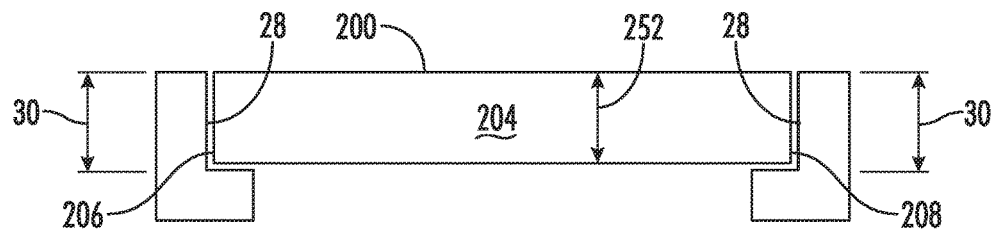
FIG. 1A is a cross-sectional view of the storage rack assembly of FIG. 1 taken along line 1A-1A.

Referring to FIG. 1, a storage rack assembly 10 is shown. The storage rack assembly 10 may be referred to as a rack assembly 10. The rack assembly 10 may include two pairs of vertical supports 12. Each pair of vertical supports 12 may include two vertical supports that define a rack depth 14 therebetween. The two pairs of vertical supports 12 are aligned and spaced apart by a rack length 16. The rack assembly 10 may further include at least one front box beam 18 and at least one rear box beam 20. The front box beam 18 may be positioned along a front rack side 22. The rear box beam may be positioned along a rear rack side 24. Each of the front and rear box beams 18, 20 may have a top box beam surface 26. Each of the front and rear box beams 18, 20 may further have a support notch 28 facing inward and extending down from the top box beam surface 26. Each support notch 28 includes a notch height 30. The rack assembly 10 is constructed to support a series of decking panels. FIG. 1 shows two different embodiments of decking panels spanning between the front and rear box beams 18, 20. In a first embodiment, the decking panel is configured to be a sloped gravity feed decking panel 100. In a second embodiment, the decking panel is configured to be a horizontal decking panel 200.

In the first embodiment, as can best be seen in FIGS. 1, 1B, and 2-4, the sloped gravity feed decking panel 100 is shown. The sloped gravity feed decking panel 100 may be referred to as a gravity feed decking panel 100 or a gravity feed panel 100. The sloped gravity feed decking panel 100 may be oriented at a slope angle 102 relative to horizontal. The gravity feed decking panel 100 may include a plurality of laterally spaced parallel structural beams 104. The plurality of laterally spaced parallel structural beams 104 may be referred to as structural beams 104. Each of the structural beams 104 may include a front end 106 and a rear end 108.

The gravity feed decking panel 100 may further include a metal sheet 110. The metal sheet 110 may include a top sheet portion 112 overlaying the structural beams 104. The metal sheet 110 may extend around and under the front ends 106 of each of the structural beams 104 to define a front panel edge 114 and a front bottom return sheet portion 116. The front panel edge 114 may be sloped at a first obtuse angle 118 relative to the top sheet portion 112. The first obtuse angle 118 may be equal to ninety degrees plus the slope angle 102. As can best be seen in FIG. 4, the front ends 106 of each of the structural beams 104 may be cut to match the first obtuse angle 118. The front ends 106 of each of the structural beams 104 may include a notch 119 to allow the front bottom return sheet portion 116 to have a first front bottom return sheet portion 116a and a second front bottom return sheet portion 116b. The first front return sheet portion 116a may extend perpendicularly from the front panel edge 114. The first front return sheet portion 116a may rest within the support notch 28. The second front bottom return sheet portion 116b may extend from the first front bottom return sheet portion 116a and be parallel to the top sheet portion 112. The rear ends 108 of each of the structural beams may extend at a second obtuse angle 120 relative to the top sheet portion 112. The first and second obtuse angles 118, 120 may have a combined total of substantially two-hundred-seventy degrees. The metal sheet 110 may further extend around and under the rear ends 108 of each of the structural beams 104 to define a rear panel edge 122 and a rear bottom return sheet portion 124. The front bottom return sheet portion 116 and rear bottom return sheet portion 124 may be collectively referred to as bottom sheet portions 116, 124.

Figure 2:
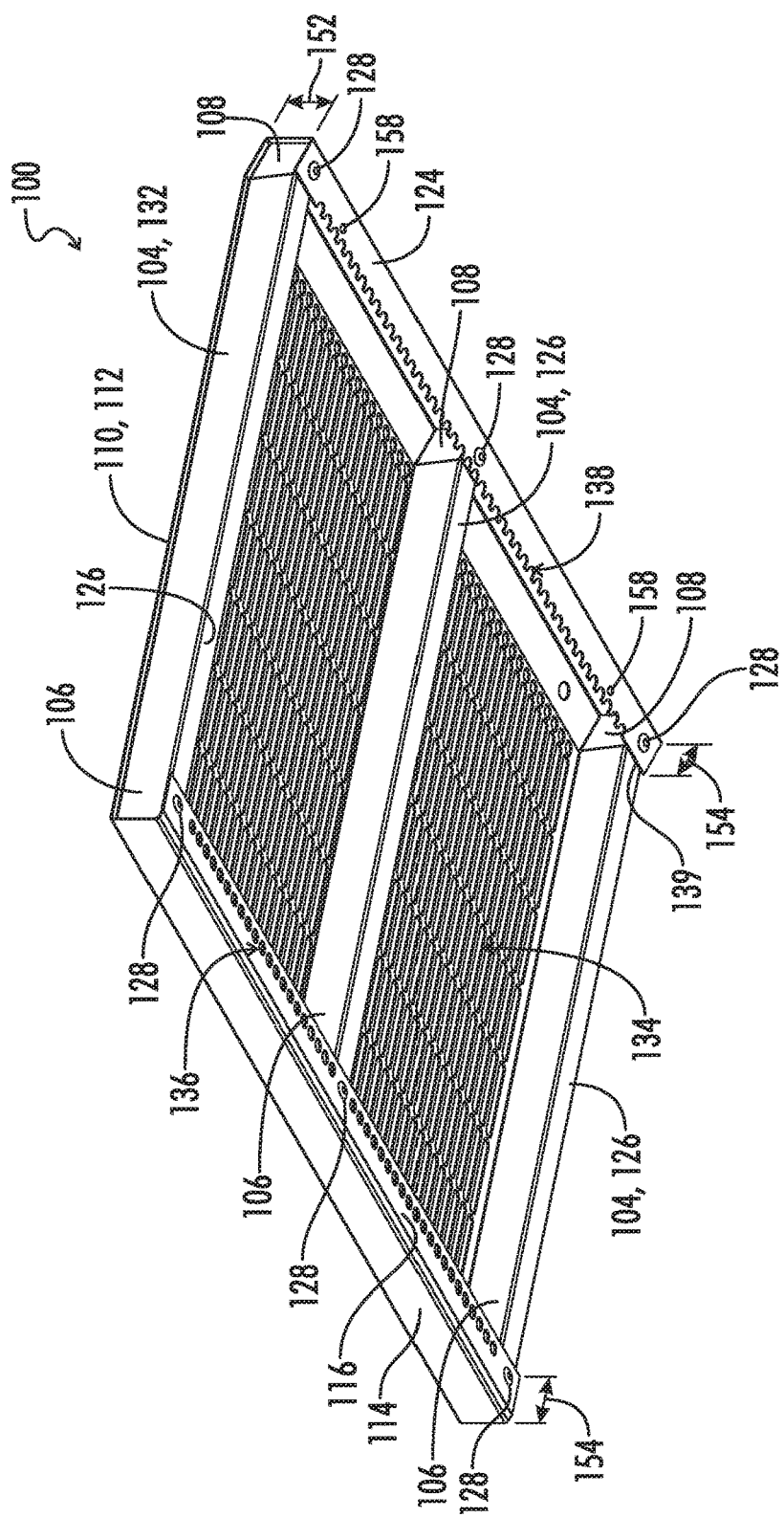
FIG. 2 is a bottom perspective view of a sloped gravity feed decking panel in accordance with the present disclosure.
Figure 4:
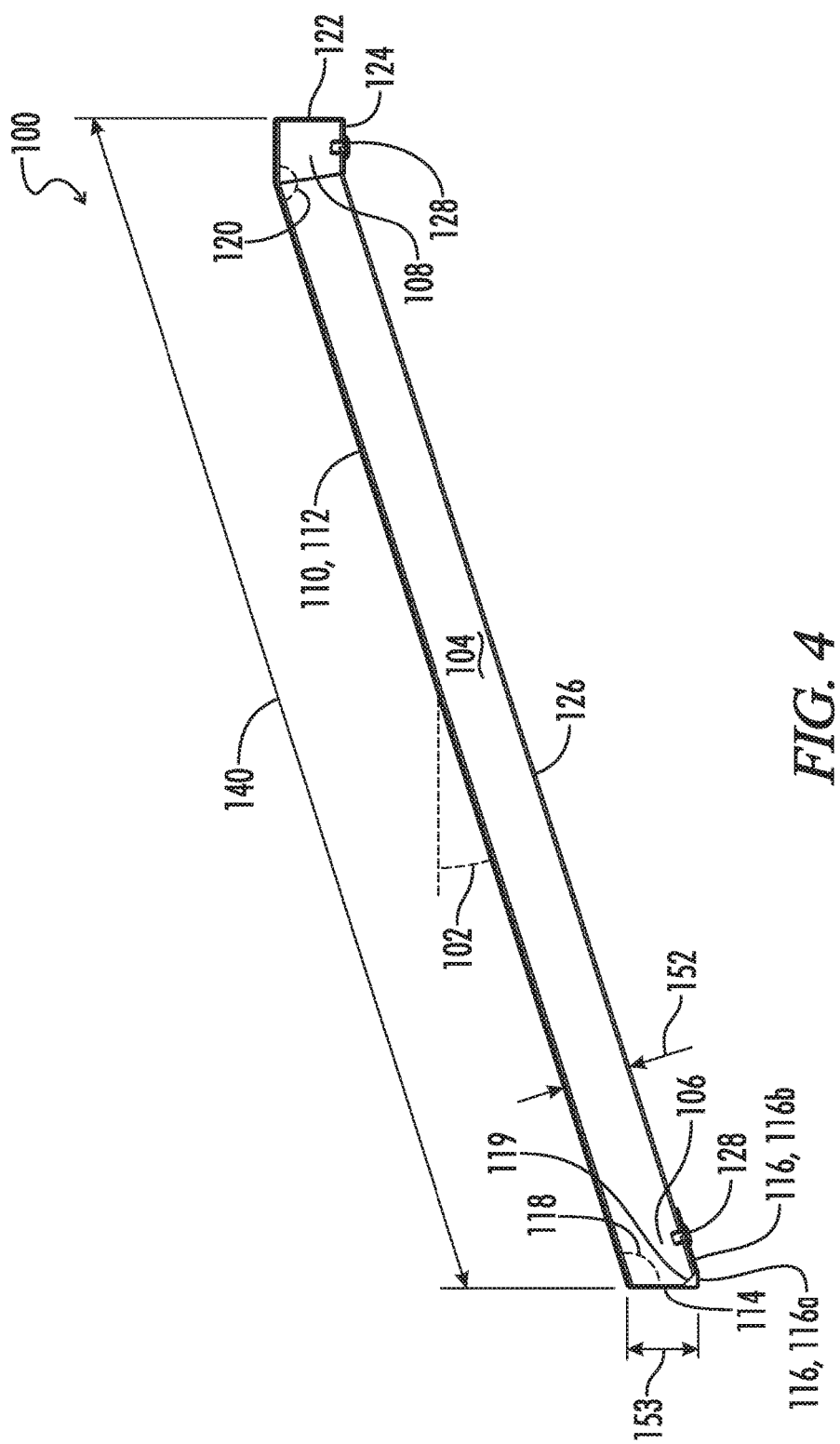
FIG. 4 is a right side elevational view of the sloped gravity feed decking panel of FIG. 2.

As can best be seen in FIGS. 2 and 4, the front and rear bottom return sheet portions 116, 124 may be attached to an underside 126 of each of the structural beams 104. The front and rear bottom return sheet portions 116, 124 may be attached using rivets 128. In other embodiments, the front and rear bottom return sheet portions 116, 124 may be attached to the underside 126 of each of the structural beams 104 in a different manner, for example by punching, welding, or the like.

The structural beams 104 may include two end beams defining a first side panel edge 130 (FIG. 3) and a second side panel edge 132. The structural beams 104 may further include at least one intermediate beam located between the two end beams. The first and second side panel edges 130, 132 may extend between the front and rear panel edges 114, 122. In some embodiments (not shown), the first and second side panel edges 130, 132 of the structural beams 104 may be integrally formed from the metal sheet 110. As can best be seen in FIGS. 2 and 4, the structural beams 104 may be formed from four sided tubing. In other embodiments (not shown), the structural beams 104 may be formed from U-shaped tubing, L-shaped tubing, round tubing, or the like.

Figure 3:
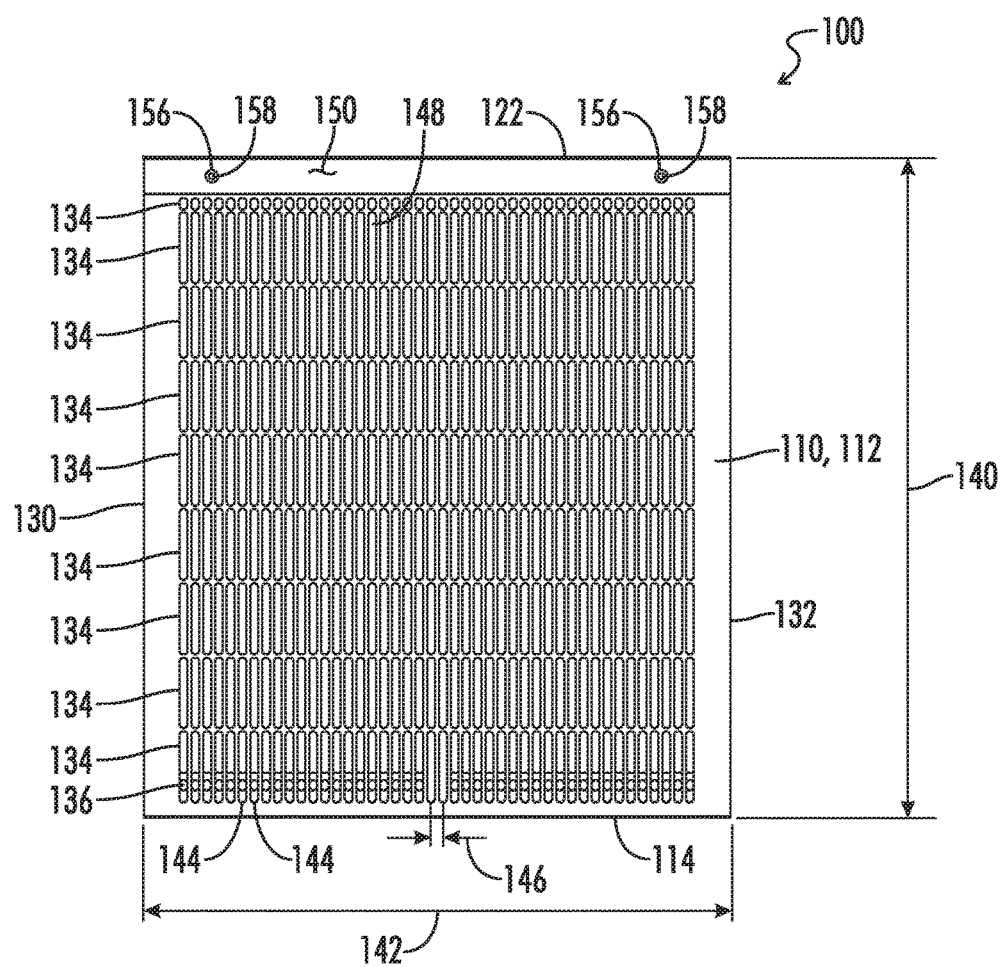
FIG. 3 is a top plan view of the sloped gravity feed decking panel of FIG. 2.

As can best be seen in FIGS. 2 and 3, the metal sheet 110 may have a plurality of top perforations 134. The front bottom return sheet portion 116 may have a first row of laterally spaced bottom perforations 136 (FIG. 2). The rear bottom return sheet portion 124 may have a second row of laterally spaced bottom perforations 138 (FIG. 2). The first and second rows of bottom perforations 136, 138 may collectively be referred to as bottom perforations 136, 138. Each of the bottom perforations 136, 138 may be aligned perpendicular to the top sheet portion 112 with one perforation of the plurality of top perforations 134. The top perforations 134 and bottom perforations 136, 138 may be aligned holes. As can best be seen in FIG. 2, each perforation of the first row of bottom perforations 136 may generally be circular. Each perforation of the second row of bottom perforations 138 may be semi-circular shaped and open to a free edge 139 of the second bottom return sheet portion 124. In other embodiments (not shown), the shape of the perforations of the first and second rows of bottom perforations 236, 238 may be different (e.g., oval, square, triangular, or the like).

Figure 1B:
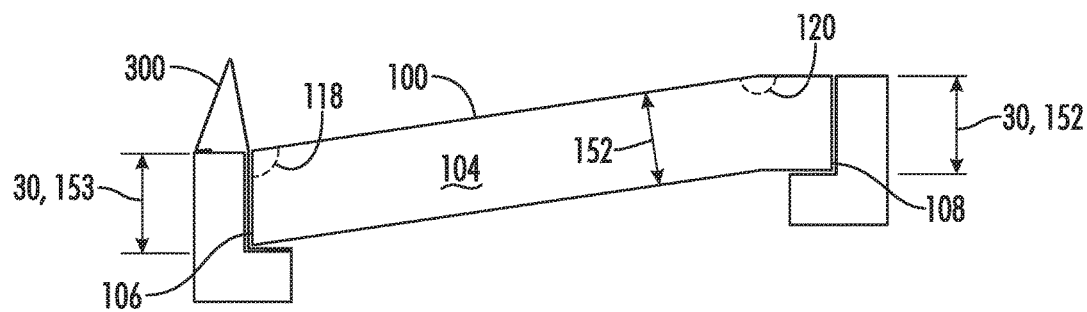
FIG. 1B is a cross-sectional view of the storage rack assembly of FIG. 1 taken along line 1B-1B.
Figure 1C:
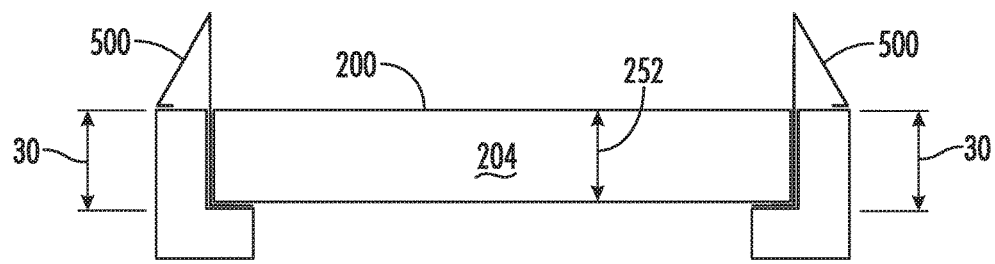
FIG. 1C is a cross-sectional view of the storage rack assembly of FIG. 1 taken along line 1C-1C.

As can best be seen in FIGS. 1B and 4, the gravity feed decking panel 100 may have a panel depth 140 defined between the front and rear panel edges 114, 122. The gravity feed decking panel 100 may further have a panel length 142 extending perpendicular to the panel depth 140. Both the panel depth 140 and the panel length 142 parallel with the top sheet portion 112.

In some embodiments, the metal sheet 110 may be perforated. As can best be seen in FIG. 3, the plurality of top perforations 134 may include a plurality of rows of slots 144. Each slot of the plurality of rows of slots 144 may be elongated parallel to the panel depth 140. The rows of slots 144 may be spaced apart along the panel length 142 by a slot row spacing 146. Each of the first and second row of bottom perforations 136, 138 may be spaced apart equal to the slot row spacing 146. The gravity feed decking panel 100 may have a perforated area 148 defined by the top perforations 134 and a top panel area 150 defined as the panel depth 140 times the panel length 142. In some embodiments, the perforated area 148 may be equal to at least 50% of the top panel area 150. In other embodiments (not shown), the metal sheet 110 of the gravity feed decking panel 100 may be solid.

As can best be seen in FIGS. 1B and 4, the gravity feed decking panel 100 may have a panel thickness 152 defined between the top sheet portion 112 and each of the front and rear bottom return sheet portions 116, 124 parallel to the top sheet portion 112. As can best be seen in FIG. 1B, the front panel edge 116 may have a front panel edge thickness 153 that is thicker than the panel thickness 152 because the front panel edge is angled relative to the top sheet portion 112. As can best be seen in FIG. 4, the front panel edge 114 may have a front panel edge thickness 153 that is substantially similar to the panel thickness 152 due to the notch 119. The front panel edge thickness 153 may be equal to the notch height 30, which may be a nominal value of one and five eighth (1⅝) of an inch or may differ depending on the notch height 30. The panel thickness 152 may be substantially equal to the notch height 30 and the front panel edge 153 may be greater than the notch height 30. Each of the front and rear bottom return sheet portions 116, 124 may have a bottom sheet depth 154 (FIG. 2) defined parallel to the top sheet portion 112 and extending from its respective front or rear panel edge 114, 122. The bottom sheet depth 154 of each of the front and rear bottom return sheet portions 116, 124 may be greater than the panel thickness 152.

As can best be seen in FIGS. 2 and 3, the gravity feed decking panel 100 may further include top sheet attachment holes 156 and bottom sheet attachment holes 158. The top sheet attachment holes 156 may be positioned on the top sheet portion 112 over the rear bottom return sheet portion 124. The top sheet attachment holes 156 may be larger than the bottom sheet attachment holes 158 to allow the head of a screw (not shown) to pass through the top sheet attachment holes 156. The bottom sheet attachment holes 158 may be positioned on the rear bottom return sheet portion 124. The top and bottom sheet attachment holes 156, 158 may be aligned. The top and bottom sheet attachment holes 156, 158 are for the receipt of a screw (not shown) to attached the gravity feed decking panel 100 to the beams 26, 28.

The gravity feed decking panel 100 may be manufactured in a series of steps. First, the metal sheet 110 is cut to size. The plurality of top perforations 134 and first and second rows of bottom perforations 136, 138 are cut at the same time. Any other perforations or holes are cut at this time also. The metal sheet 110 may then be manipulated to form the front panel edge 112, the front bottom return sheet portion 116, the rear panel edge 122, and the rear bottom return sheet portion 124. Next, structural beams 104 are cut to size and a hole is punched in each of the front and rear ends 106, 108. The structural beams 104 are then slid into the folded metal sheet 110 and attached to the bottom return sheet portions 116, 124. By attaching the structural beams 104 to the bottom return sheet portions 116, 124, the structural beams 104 are under a compressive force when weight is applied to the top sheet portion 112.

The gravity feed decking panel 100 may include various optional accessories. As can best be seen in FIGS. 1, 1B, 12, and 13, the gravity feed decking panel 100 may include a front stop wall 300. The front stop wall 300 may be formed from sheet metal. The front stop wall 300 may include a lower vertical leg 302, a wall 304, and an upper leg 306. The vertical leg 302 may be positioned adjacent to and in contact with the front panel edge 114. The wall 304 may be facing toward the gravity feed decking panel 100. The wall 160 may be sloped forward, away from the gravity feed decking panel 100, at a third obtuse angle 308 relative to the lower vertical leg 302. The third obtuse angle 308 may be substantially equal to the second obtuse angle 120 or substantially equal to the slope angle 102 plus ninety degrees. The upper leg 306 may extend downward from the wall 304. The upper leg 306 may terminate short of a lower end 310 of the lower vertical leg 302. When the lower vertical leg 302 is received between the support notch 28 of the front box beam 18 and the front panel edge 114 of the gravity feed decking panel 100, the upper leg 306 may terminate near the top box beam surface 26. The lower vertical leg 302 and the upper leg 306 may each terminate in rearward extending horizontal flanges 312, 314, respectively. The rearward extending horizontal flange 314 of the upper leg 306 may extend parallel to the top box beam surface 26. The rearward extending horizontal flange 312 of the lower vertical leg 302 may include stop wall attachment holes 316. The stop wall attachment holes 316 may be configured to receive a fastener (not shown). The rearward extending horizontal flange 312 of the lower vertical leg 302 may be connected to support notch 28 using the stop wall attachment holes 314.

Figure 14:
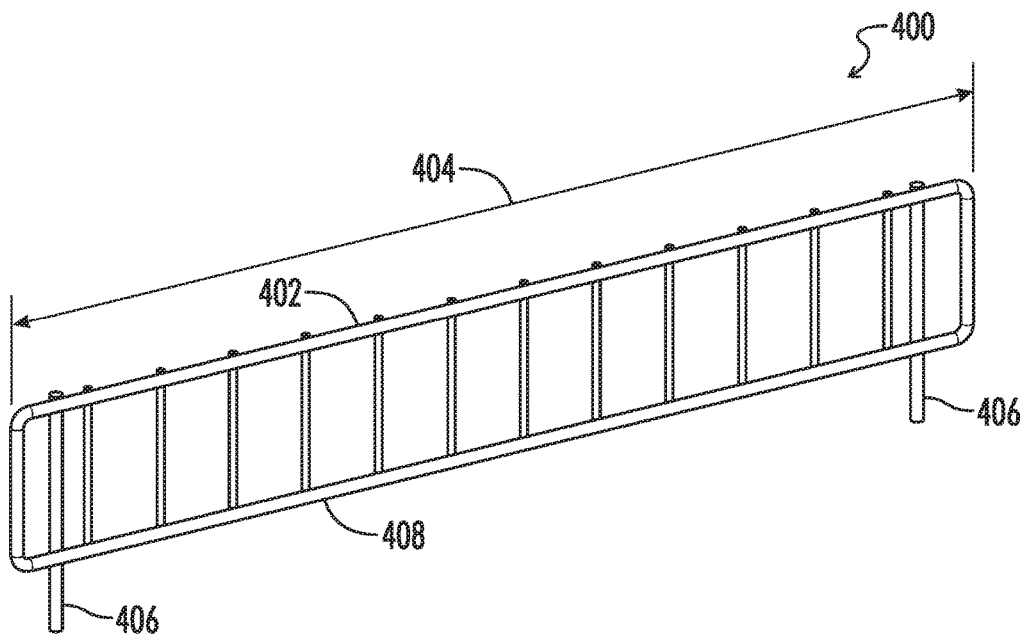
FIG. 14 is a perspective view of a wire divider wall in accordance with the present disclosure.
Figure 15:
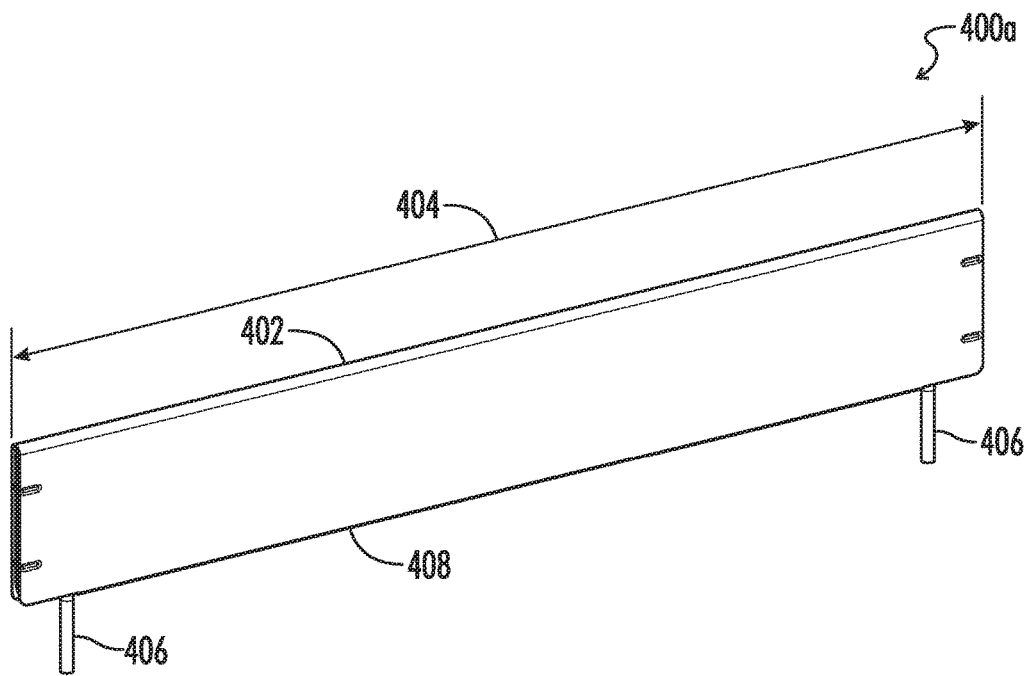
FIG. 15 is a perspective view of a solid divider wall in accordance with the present disclosure.

As can best be seen in FIGS. 1, 14, and 15, the gravity feed decking panel 100 may include a divider wall 400. The divider wall 400 may have a main wall body 402. The main wall body 402 may have a wall length 404 parallel to the panel depth 140. The divider wall 400 may include posts 406 extending perpendicularly from a bottom edge 408 of the main wall body 402. The posts 406 being received through both a top and bottom perforation stabilizes the divider wall 400, 400a. The posts 406 may be configured to be received through the aligned top perforations 134 and bottom perforations 136, 138. As can best be seen in FIG. 14, the main wall body 402 of the divider wall 400 may be formed from wire. In other embodiments, as can best be seen in FIG. 15, the main wall body 402 of the divider wall 400a may be formed from sheet metal.

In the second embodiment, as can best be seen in FIGS. 1, 1A, 1C, and 5-9, the horizontal decking panel 200 is shown. The horizontal decking panel 200 may include a plurality of laterally spaced parallel structural beams 204. The plurality of structural beams 204 may include two end beams 204a, 204c. The end beams 204a, 204c may be referred to as outer beams 204a, 204c. The plurality of structural beams 204 may further include at least one intermediate beam 204b positioned between the two end beams 204a, 204c. Each structural beam 204 may include a first end 206 and a second end 208.

The horizontal decking panel 200 may further include a metal sheet 210. The metal sheet 210 may include a top sheet portion 212 overlaying the structural beams 204. The metal sheet 210 may extend around and under the first ends 206 of each of the support beams 204 to define a first panel edge 214 and a first bottom return sheet portion 216. The metal sheet 210 may further extend around and under the second ends 206 of each of the support beams 204 to define a second panel edge 222 and a second bottom return sheet portion 224.

Figure 5:
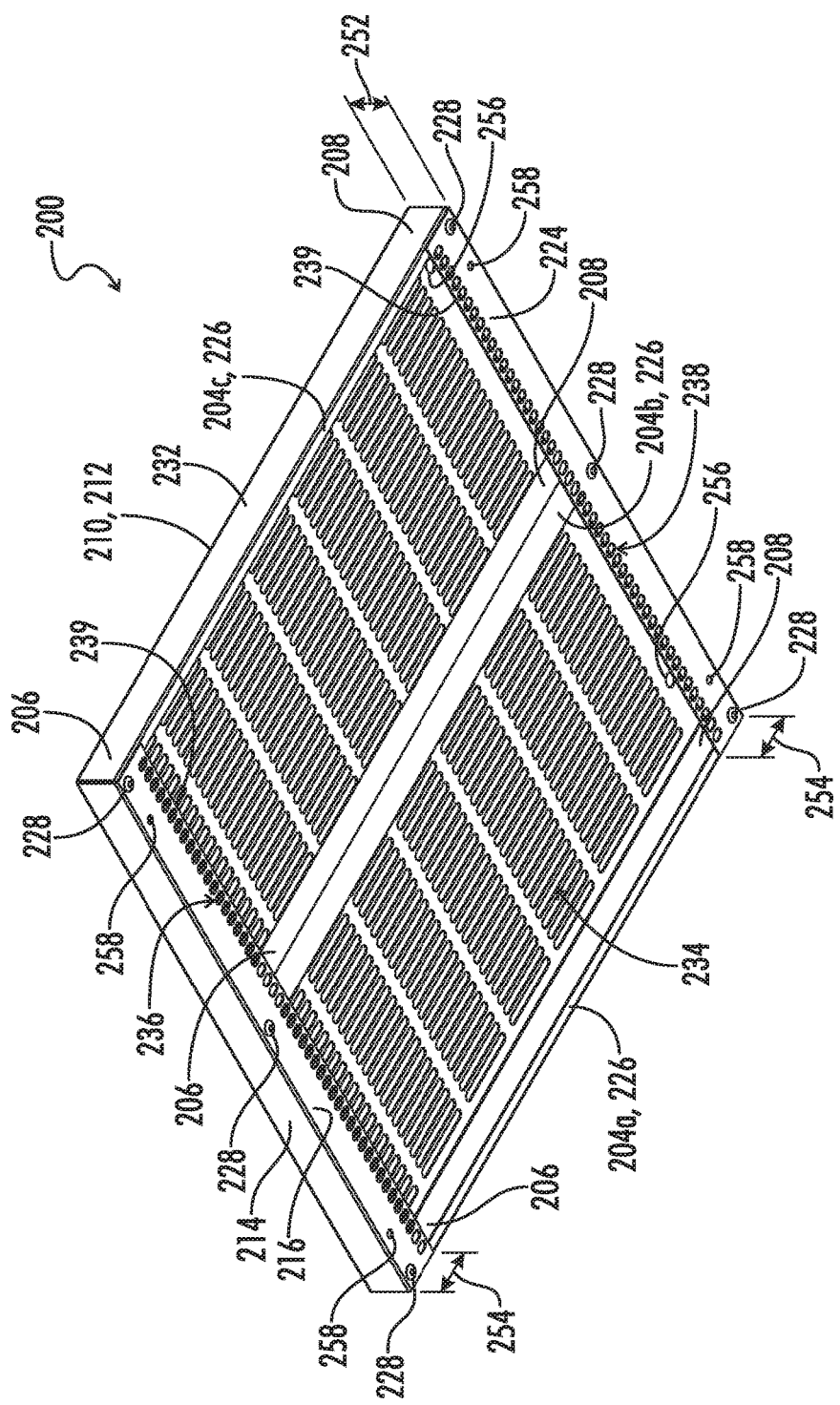
FIG. 5 is a bottom perspective of a horizontal perforated decking panel in accordance with the present disclosure.
Figure 7:
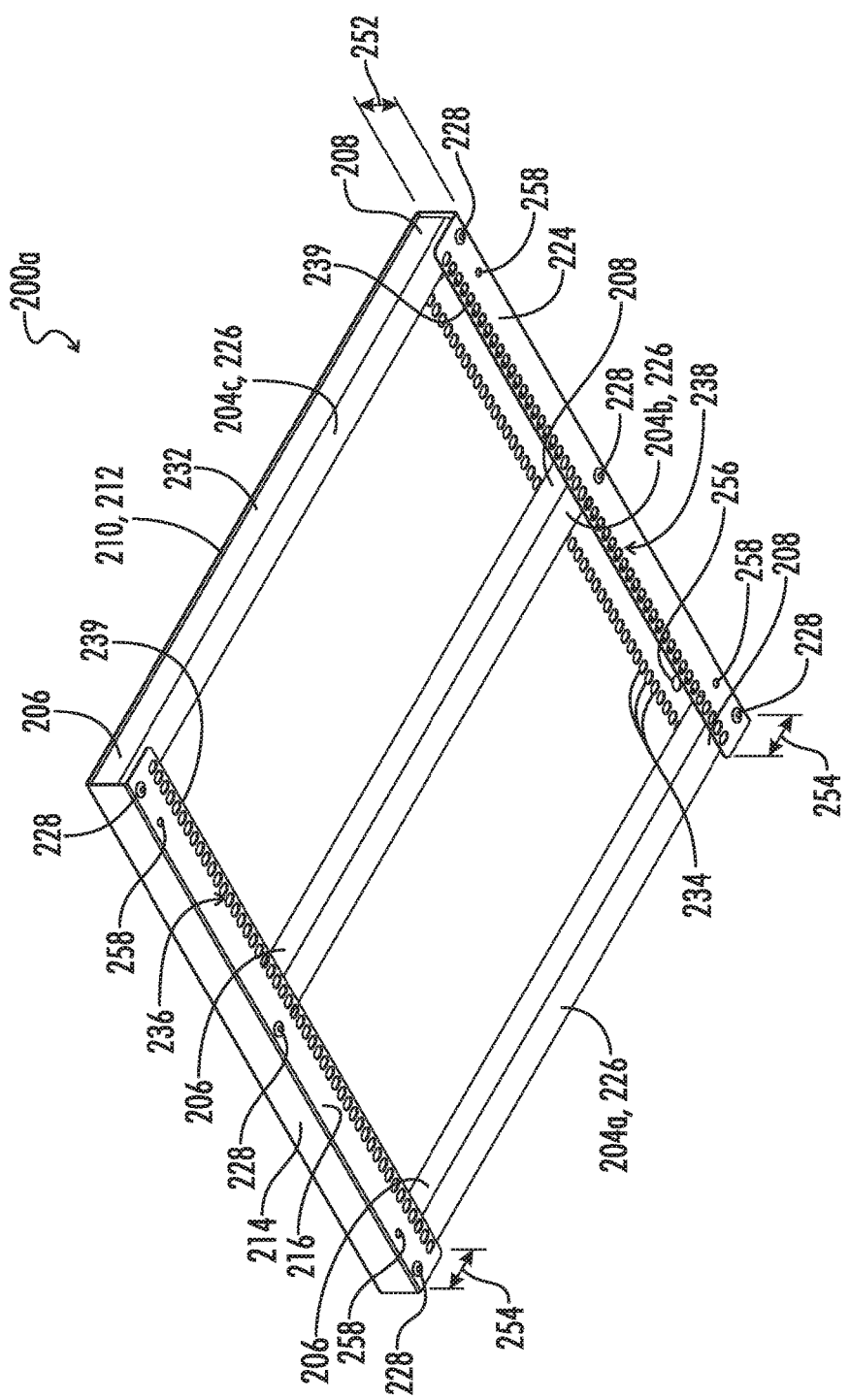
FIG. 7 is a bottom perspective of a horizontal solid sheet decking panel in accordance with the present disclosure.
Figure 9:
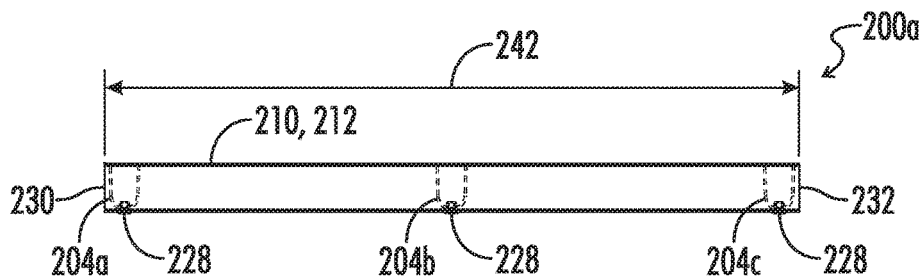
FIG. 9 is a front elevational view of the horizontal solid sheet decking panel of FIG. 7.

As can best be seen in FIGS. 5, 7, and 9, the first and second bottom return sheet portions 216, 224 may be attached to an underside 226 of each of the structural beams 204. The first and second bottom return sheet portions 216, 224 may be attached using rivets 228. In other embodiments (not shown), the first and second bottom return sheet portions 216, 224 may be attached to the underside 226 of each of the structural beams 204 in a different manner, for example by punching, welding, or the like.

Figure 6:
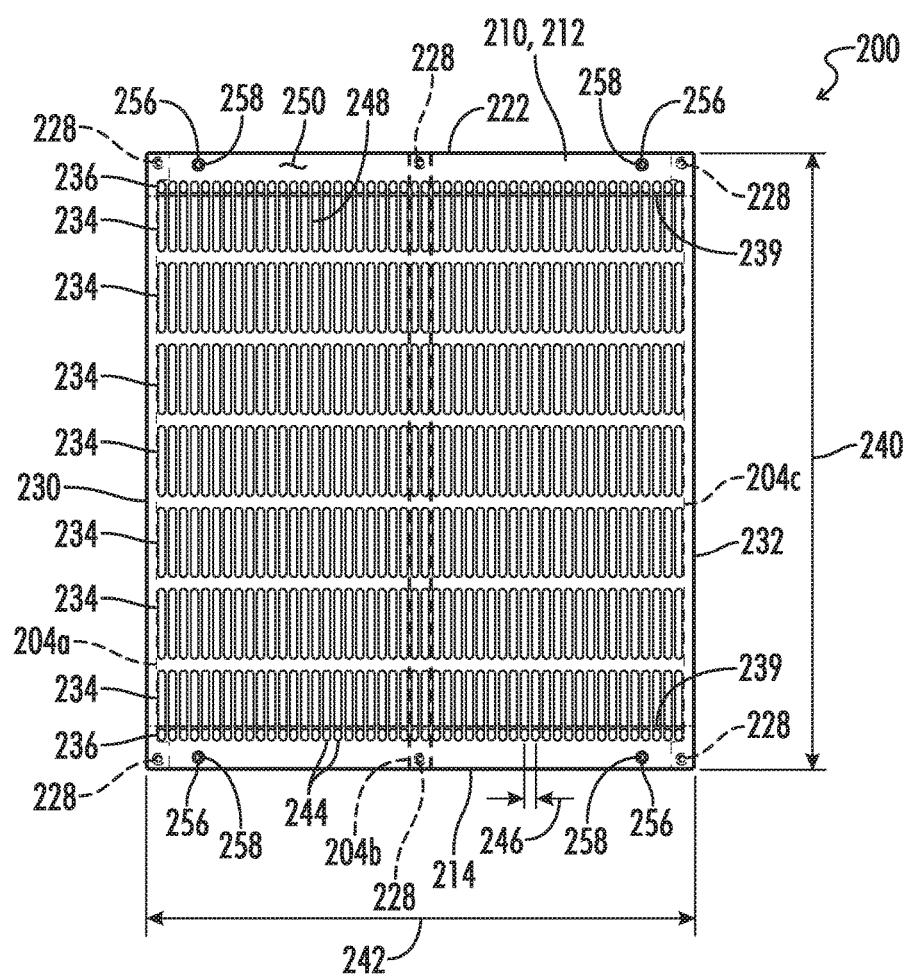
FIG. 6 is a top plan view of the horizontal perforated decking panel of FIG. 5.
Figure 8:
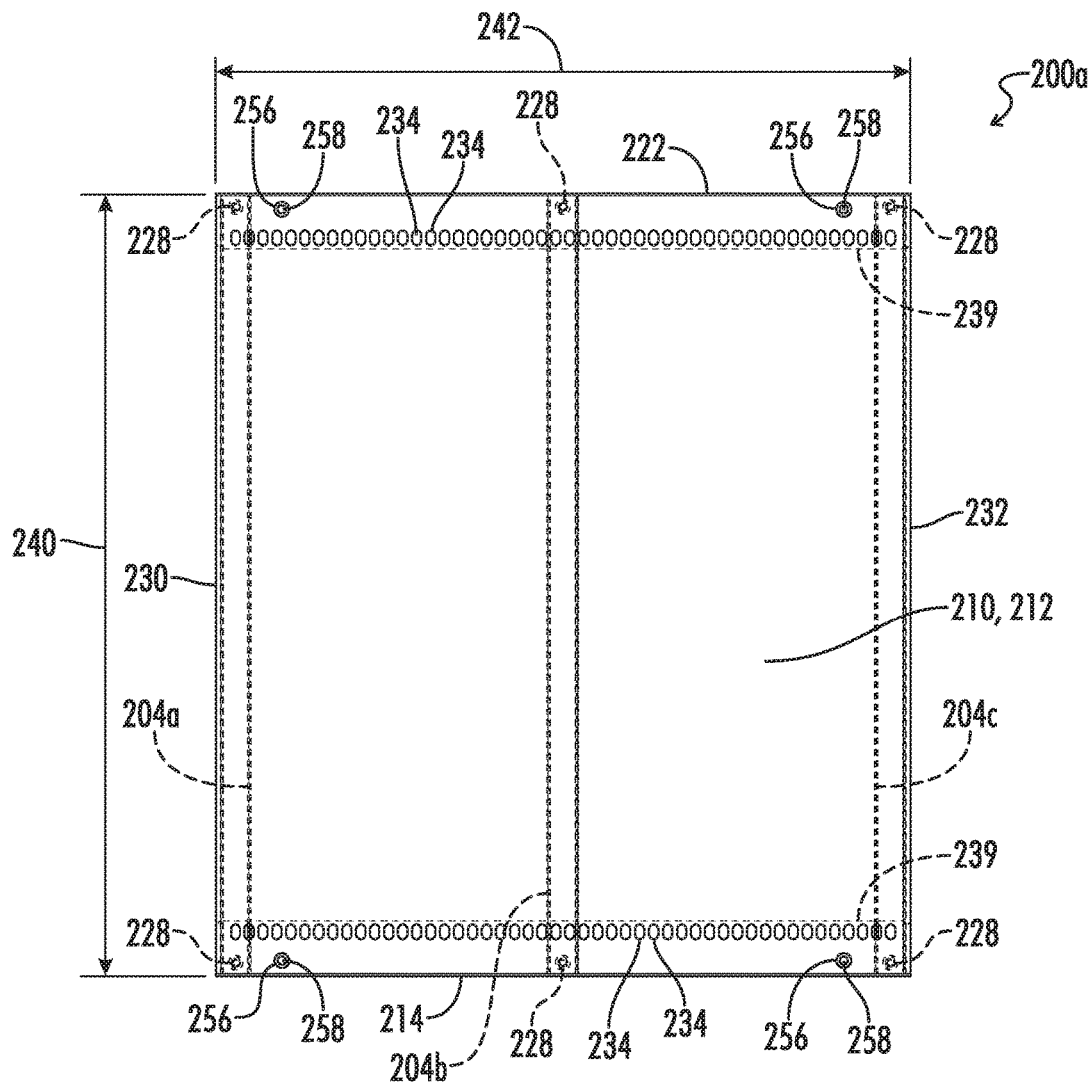
FIG. 8 is a top plan view of the horizontal solid sheet decking panel of FIG. 7.

As can best be seen in FIGS. 6, 8, and 9, the end beams 204a and 204c define a third panel edge 230 and a fourth panel edge 232, respectively. The at least one intermediate beam 204b may be located between the third panel edge 230 and the fourth panel edge 232. The third and fourth panel edges 230, 232 may extend between the first panel edge 214 and the second panel edge 222. The end beams 204a, 204c may be integrally formed. An example of integrally formed end beams can best be seen in FIGS. 5 and 6 where the third and fourth panel edges 230, 232 are formed by folding over the meal sheet 210 to form the channel shaped end beams 204a, 204c. The end beams 204a, 204c could be separate beams such as shown in FIGS. 7 and 9. As can best be seen in FIGS. 5 and 6, the at least one intermediate beam 204b may be formed from U-shaped tubing. As can best be seen in FIGS. 7 and 9, the structural beams 240a, 204b, 204c may be formed from U-shaped tubing. In other embodiments (not shown), the structural beams 240a, 204b, 204c may be separately formed from square tubing, L-shaped tubing, round tubing, or the like.

As can best be seen in FIGS. 5 and 7, the metal sheet 210 may have a plurality of top perforations 234. The first bottom return sheet portion 216 may have a first row of laterally spaced bottom perforations 236. The first row of laterally spaced bottom perforations 236 may be referred to as a first row of bottom perforations 236. The second bottom return sheet portion 224 may have second row of laterally spaced bottom perforations 238. The second row of laterally spaced bottom perforations 238 may be referred to as a second row of bottom perforations 238. The first and second rows of bottom perforations 236, 238 may collectively be referred to as bottom perforations 236, 238. Each of the bottom perforations 236, 238 may be aligned with one perforation of the plurality of top perforations 234. The top perforations 234 and bottom perforations 236, 238 may be aligned holes. As can best be seen in FIGS. 5 and 7, each perforation of the first and second rows of bottom perforations 236, 238 may generally be circular. In other embodiments (not shown), the shape of the perforations of the first and second rows of bottom perforations 236, 238 may be different (e.g., oval, square, triangular, or the like). In still further embodiments (not shown), each perforation of first and second rows of bottom perforations 236, 238 may be open to a free edge 239 of the first or second bottom return sheet portions 216, 224.

As can best be seen in FIGS. 1, 6, and 8, the horizontal decking panel 200 may have a panel depth 240 defined between the first and second panel edges 214, 222. The horizontal decking panel 200 may further have a panel length 242 extending perpendicular to the panel depth 240. Both the panel depth 240 and the panel length 242 parallel with the top sheet portion 212.

As can best be seen in FIGS. 1, 5, and 6, the metal sheet 210 of the horizontal decking panel 200 may be perforated. The plurality of top perforations 234 may include a plurality of rows of slots 244. Each slot of the plurality of rows of slots 244 may be elongated parallel to the panel depth 240. The rows of slots 244 may be spaced apart along the panel length 242 by a slot row spacing 246. Each perforation of the first and second rows of bottom perforations 236, 238 may be spaced apart equal to the slot row spacing 246. The horizontal decking panel 200 may have a perforated area 248 defined by the top perforations 234 and a top panel area 250 defined as the panel depth 240 times the panel length 242. The perforated area 248 may be equal to at least 50% of the top panel area 250.

In other embodiments as can best be seen 1, 7 and 8, the metal sheet 210 of the horizontal decking panel 200a may be solid. The horizontal decking panel 200a may be referred to as a solid horizontal decking panel 200a. The solid horizontal decking panel 200a is the same as the horizontal decking panel 200 except the metal sheet 210 is solid and not perforated. The solid horizontal decking panel 200a does not include the rows of slots 244. The top perforations 234, however, may be spaced apart along the panel length 242 by the slot row spacing 246 and may be aligned in rows. The plurality of top perforations 234 may be circular and configured to align vertically with each perforation of the first and second rows of bottom perforations 236, 238. Each perforation of the top perforations 234 may be vertically aligned with one perforation of the first and second rows of bottom perforations 236, 238.

As can best be seen in FIGS. 1A, 1C, 5, 7, and 9, the horizontal decking panel 200 may have a panel thickness 252 defined between the top sheet portion 212 and each of the first and second bottom return sheet portions 216, 224. The panel thickness 252 may be substantially equal to the notch height 30. The panel thickness 252 may be a nominal value of one and five eighth (1⅝) of an inch or may differ depending on the notch height 30. Each of the first and second bottom return sheet portions 216, 224 may have a bottom sheet depth 254 (FIGS. 5 and 7) defined parallel to the top sheet portion 212 and extending from its respective first or second panel edge 214, 222. The bottom sheet depth 254 may be greater than the panel thickness 252.

As can best be seen in FIGS. 5-8, the horizontal decking panel 200 may further include top sheet attachment holes 256 and bottom sheet attachment holes 258. The top sheet attachment holes 256 may be positioned on the top sheet portion 212 over both the first and second bottom return sheet portions 216, 224. The top sheet attachment holes 256 may be larger than the bottom sheet attachment holes 258 to allow the head of a screw (not shown) to pass through the top sheet attachment holes 256. The bottom sheet attachment holes 258 may be positioned on both the first and second bottom return sheet portions 216, 224. The top and bottom sheet attachment holes 256, 258 may be aligned. The top and bottom sheet attachment holes 256, 258 are for the receipt of a screw (not shown) to attached the horizontal decking panel 200 to the beams 26, 28.

The horizontal decking panel 200 may be manufactured in a series of steps. First, the metal sheet 210 is cut to size. The plurality of top perforations 234 and first and second rows of bottom perforations 236, 238 are cut at the same time. Any other perforations or holes are cut at this time also. The metal sheet 210 may then be manipulated to form the front panel edge 214, the front bottom return sheet portion 216, the rear panel edge 222, and the rear bottom return sheet portion 224. Next, structural beams 204 are cut to size and a hole is punched in each of the front and rear ends 206, 208. The structural beams 204 are then slid into the folded metal sheet 210 and attached to the bottom return sheet portions 216, 224. If the horizontal decking panel 200 includes integrally formed end beams 204a, 204c, the top sheet is manipulated to form those end beams 204a, 204c after the intermediate beams 204b are positioned. By attaching the structural beams 204 to the bottom return sheet portions 216, 224, the structural beams 204 are under a compressive force when weight is applied to the top sheet portion 212.

Figure 10:
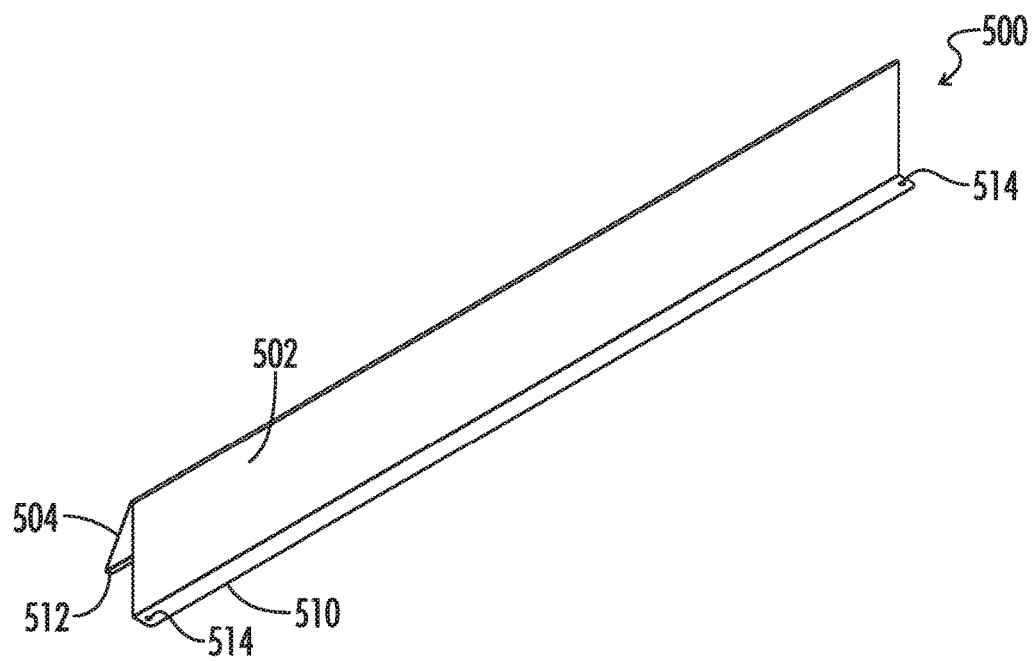
FIG. 10 is a perspective view of a stop wall for use with a horizontal decking panel in accordance with the present disclosure.
Figure 11:
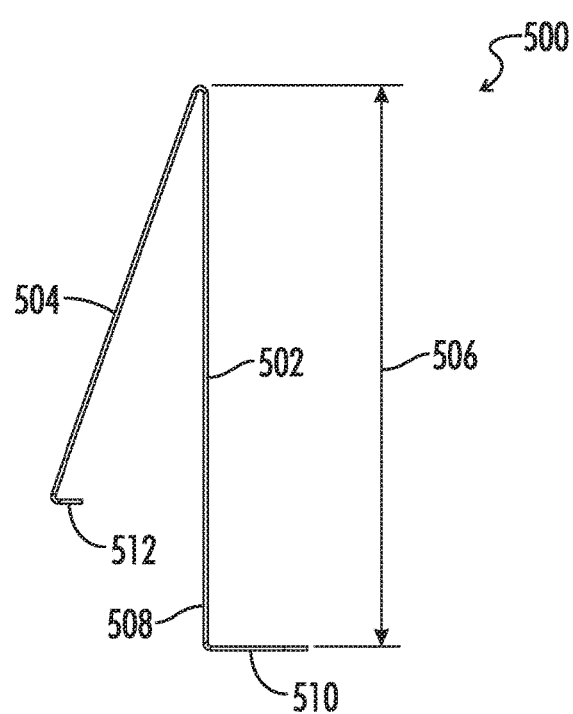
FIG. 11 is a left side elevational view of the stop wall of FIG. 10.
Figure 12:
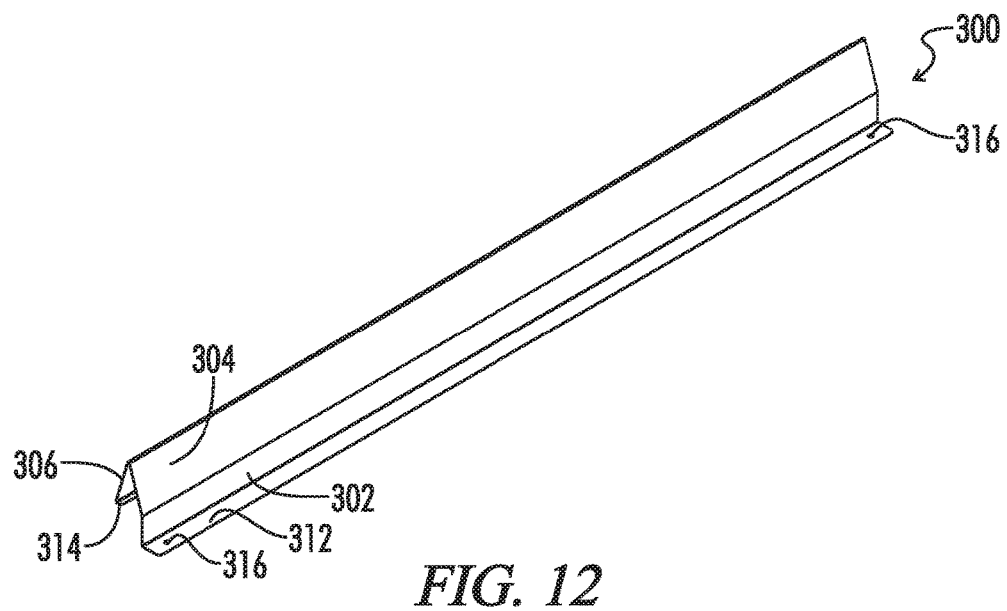
FIG. 12 is a perspective view of a front stop wall for use with a sloped decking panel in accordance with the present disclosure.
Figure 13:
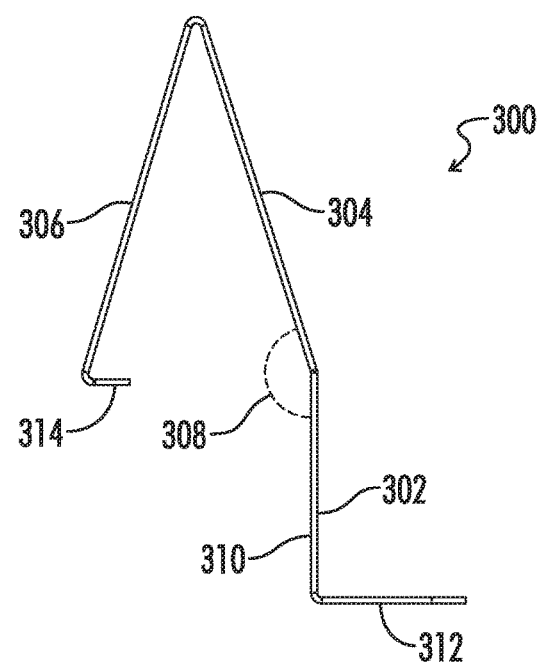
FIG. 13 is a left side elevational view of the front stop wall of FIG. 12.

The horizontal decking panel 200 may include various optional accessories. As can best be seen in FIGS. 1, 1C, 10, and 11, the horizontal decking panel 200 may include at least one stop wall 500. The at least one stop wall 500 may be formed from sheet metal. As can best be seen in FIGS. 10 and 11, the at least one stop wall 500 may include a main vertical wall 502 and an upper leg 504. The main vertical wall 502 may be positioned adjacent to and in contact with either the first panel edge 214 or second panel edge 222. The main vertical wall 502 may be facing toward the horizontal decking panel 200. The main vertical wall 502 may have a main vertical wall height 506. The main vertical wall height 506 may be greater than the panel thickness 252. The upper leg 504 may extend downward from the main vertical wall 502 and away from the horizontal decking panel 200. The upper leg 504 may terminate short of a lower end 508 of the main vertical wall 502. When the stop wall 500 is received between the horizontal decking panel 200 and in the support notch 28, the upper leg 504 may terminate near the top box beam surface 26. The main vertical wall 502 and the upper leg 504 may each terminate in rearward extending horizontal flanges 510, 512, respectively. The rearward horizontal flange 510 of the main vertical wall 502 may extend parallel to either the first bottom return sheet portion 216 or the second bottom return sheet portion 224. The rearward extending horizontal flange 510 of the main vertical wall 502 may include stop wall attachment holes 514. The stop wall attachment holes 514 may be configured to receive a fastener (not shown). The rearward extending horizontal flange 512 of the lower vertical leg 502 may be connected to the support notch 28 using the stop wall attachment holes 514. The rearward extending horizontal flange 512 of the upper leg 504 may extend parallel to the top box beam surface 26 of either the front box beam 18 or the rear box beam 20.

Figure 16:
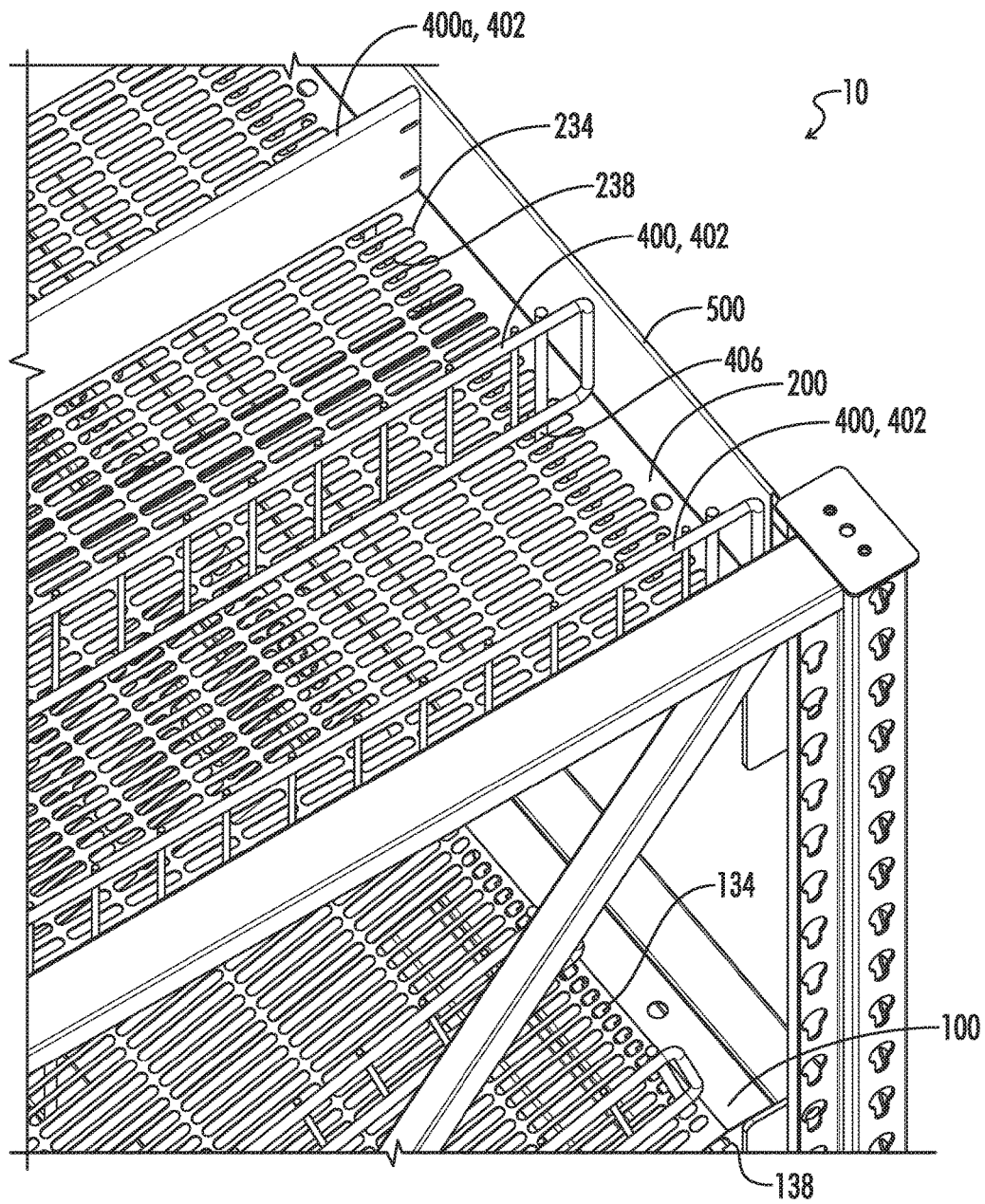
FIG. 16 is an enlarged perspective view of the upper right rear corner of the storage rack assembly of FIG. 1.

As can best be seen in FIGS. 1, 14, 15, the horizontal decking panel 200 may include the divider wall 400, 400a. The posts 406 of the divider wall 400, 400a may be configured to be received through the aligned top perforations 234 and bottom perforations 236, 238. As can best be seen in FIG. 16, the posts 406 nearest the rear rack side 24 are received through aligned top perforations 234 and bottom perforations from the second row of bottom perforations 138. Each post, by being received through both a top and bottom perforation, stabilizes the divider wall 400, 400a.

Thus, although there have been described particular embodiments of the present invention of a new and useful PERFORATED DECKING it is not intended that such references be construed as limitations upon the scope of this invention except as set forth in the following claims.

What is claimed is:

1. A decking panel, comprising;
   a plurality of laterally spaced parallel structural beams, each beam having a first end and a second end;
   a metal sheet including a top sheet portion overlying the structural beams;
   the sheet extending around and under the first ends of each of the beams to define a first panel edge and a first bottom return sheet portion;
   the sheet extending around and under the second ends of each of the beams to define a second panel edge and a second bottom return sheet portion;
   the first and second bottom return sheet portions being attached to an underside of each of the beams; and
   the metal sheet having a plurality of top perforations defined therein, and the first and second bottom return sheet portions having first and second rows, respectively, of laterally spaced bottom perforations defined therein, each of the bottom perforations being aligned with one of the top perforations, wherein:
   the first and second panel edges define a panel depth therebetween, the decking panel having a panel length extending perpendicular to the panel depth;
   the top perforations comprise a plurality of rows of slots elongated parallel to the panel depth;
   the rows of slots being spaced apart along the panel length by a slot row spacing; and
   the bottom perforations of each of the first and second rows of bottom perforations are spaced apart equal to the slot row spacing.

2. The decking panel of claim 1, wherein:
   the top perforations collectively define a perforated area equal to at least 50% of a top panel area defined as the panel depth times the panel length.

3. The decking panel of claim 1, in combination with:
   a divider wall having a divider wall length parallel to the panel depth, the divider wall including posts configured to be received through the aligned top and bottom perforations.

4. The decking panel of claim 1, wherein:
the decking panel is configured to be a horizontal decking panel and the first and second panel edges extend substantially perpendicular to the top sheet portion and the first and second bottom return sheet portions.

5. The decking panel of claim 4, wherein:
the decking panel has a panel thickness defined between the top sheet portion and each of the bottom return sheet portions; and
each of the bottom return sheet portions extends depthwise from its respective edge by a bottom sheet depth greater than the panel thickness.

6. The decking panel of claim 4, wherein the panel thickness has a nominal value of 1⅝ inch.

7. The decking panel of claim 1, wherein:
the plurality of laterally spaced parallel structural beams includes two end beams defining third and fourth panel edges extending between the first and second panel edges, and at least one intermediate beam located between the two end beams.

8. The decking panel of claim 7, wherein:
the third and fourth panel edges are integrally formed from the metal sheet.

9. The decking panel of claim 1, in combination with:
at least one stop wall formed of sheet metal and including:
a main vertical wall facing toward the decking panel, the main vertical wall having a main vertical wall height greater than a panel thickness;
an upper leg extending downward from the main vertical wall away from the decking panel and terminating short of a lower end of the main vertical wall.

10. The combined decking panel and stop wall of claim 9, wherein:
the main vertical wall and the upper leg each terminate in a rearward extending horizontal flange.

11. The decking panel of claim 1, wherein:
the decking panel is configured to be a sloped gravity feed panel;
the first panel edge is sloped at a first obtuse angle to the top sheet portion; and
the second ends of each of the structural beams are sloped at a second obtuse angle to the top sheet portion, the first and second obtuse angles having a combined total of substantially 270 degrees.

12. The decking panel of claim 11, wherein:
the structural beams are formed from four sided tubing.

13. The decking panel of claim 1, in combination with:
a rack for receiving the decking panel, the rack including vertical support posts and horizontal box beams with notches for receiving the decking panel.

14. A gravity feed decking panel configured to be oriented at a slope angle, comprising:
a plurality of parallel structural beams, each beam having a front end and a rear end;
a perforated metal sheet including a top sheet portion overlying the structural beams;
the perforated metal sheet extending around and under the front ends of each of the beams to define a front panel edge and a front bottom return sheet portion, the front panel edge being sloped at a first obtuse angle to the top sheet portion, the first obtuse angle being substantially equal to 90 degrees plus the slope angle; and
the rear ends of each of the structural beams extending at a second obtuse angle relative to the top sheet portion, the second obtuse angle being substantially equal to 180 degrees minus the slope angle.

15. The gravity feed decking panel of claim 14, wherein:
the top sheet portion and the front bottom return sheet portion each have aligned holes therein for receiving a post of a divider wall.

16. The gravity feed decking panel of claim 14, wherein:
the structural beams are formed from four sided tubing.

17. The gravity feed decking panel of claim 14, in combination with:
a front stop wall formed of sheet metal and including:
a lower vertical leg;
a wall facing the decking panel and inclined forward relative to the lower vertical leg by an inclination angle substantially equal to the slope angle; and
an upper leg extending downward from the wall and terminating short of a lower end of the lower vertical leg.

18. The combined gravity feed decking panel and front stop wall of claim 17, wherein:
the upper and lower legs of the front stop wall each terminate in a rearward extending horizontal flange.

19. The gravity feed decking panel of claim 14, wherein:
the top sheet portion includes a plurality of perforations having a combined perforation area of at least 50% of a total area of the top sheet portion.

20. A storage rack assembly comprising:
two pairs of vertical support posts, each pair of vertical support posts defining a rack depth, the two pairs of vertical support posts aligned and separated by a rack length;
at least one front box beam positioned along a front side of the two pairs of vertical support posts, the at least one front box beam spanning between the two pairs of vertical support posts;
at least one rear box beam positioned along a rear side of the two pairs of vertical support posts, the at least one rear box beam spanning between the two pairs of vertical support posts, each of the front and rear box beams having a support notch facing inward, each rear box beam is positioned higher than each front box beam;
a decking panel spanning between the front box beam and the rear box beam and received by the support notch of each beam, the decking panel configured to be a sloped gravity feed panel, the decking panel comprising:
a plurality of parallel structural beams, each beam having a first end and a second end;
a metal sheet including a top sheet portion overlying the structural beams;
the metal sheet extending around and under the first ends of each of the beams to define a first panel edge and a first bottom return sheet portion, the first panel edge being sloped at a first obtuse angle to the top sheet portion;
the metal extending wrapped around and under the second ends of each of the beams to define a second panel edge and a second bottom return sheet portion, the second ends of each of the structural beams being sloped at a second obtuse angle to the top sheet portion, the first and second obtuse angles having a combined total of substantially 270 degrees; and
the metal sheet having a plurality of top perforations defined therein, and the first and second bottom return sheet portions having first and second rows, respectively, of laterally spaced bottom perforations defined therein, each of the bottom perforations being aligned with one of the top perforations so that a post of a divider wall can be received through the aligned top and bottom perforations.

21. The storage rack assembly of claim 20, wherein
the support notch has a notch height; and
the decking panel has a panel thickness defined between the top sheet portion and each of the bottom return sheet portions, the panel thickness substantially equal to the notch height.

22. A decking panel system, comprising:
a decking panel configured to be a sloped gravity feed panel comprising:
- a plurality of laterally spaced parallel structural beams, each beam having a first end and a second end;
- a metal sheet including a top sheet portion overlying the structural beams;
- the sheet extending around and under the first ends of each of the beams to define a first panel edge and a first bottom return sheet portion, the first panel edge is sloped at a first obtuse angle to the top sheet portion;
- the sheet extending around and under the second ends of each of the beams to define a second panel edge and a second bottom return sheet portion, the second ends of each of the structural beams are sloped at a second obtuse angle to the top sheet portion, the first and second obtuse angles having a combined total of substantially 270 degrees;
- the first and second bottom return sheet portions being attached to an underside of each of the beams; and
- the metal sheet having a plurality of top perforations defined therein, and the first and second bottom return sheet portions having first and second rows, respectively, of laterally spaced bottom perforations defined therein, each of the bottom perforations being aligned with one of the top perforations; and a front stop wall formed of sheet metal, the front stop wall comprising:
- a lower vertical leg;
- a wall facing toward the decking panel and sloped forward at a third obtuse angle to the lower vertical leg, the third obtuse angle being substantially equal to the second obtuse angle; and
- an upper leg extending downward from the wall and terminating short of a lower end of the lower vertical leg.

23. The decking panel system of claim 22, wherein:
the upper and lower legs of the front stop wall each terminate in a rearward extending horizontal flange.

\* \* \* \* \*